United States Patent Office 3,560,912
Patented Feb. 2, 1971

3,560,912
CONTROL SYSTEM FOR A TOWED VEHICLE
Paul G. Spink, Severna Park, and James T. Malone, Arnold, Md., assignors to Westinghouse Electric Corporation, Pittsburgh, Pa., a corporation of Pennsylvania
Filed Feb. 3, 1969, Ser. No. 795,913
Int. Cl. B63b 21/00; B64d 3/00; G01s 9/68
U.S. Cl. 340—3
6 Claims

ABSTRACT OF THE DISCLOSURE

A towed underwater vehicle having rotatable wing and tail surfaces is maintained in a predetermined orientation at a constant height above the ocean bottom, or at a constant depth below the surface, by commanding a rate of rotation of the wing or tail surfaces when a deviation from the desired attitude occurs.

BACKGROUND OF THE INVENTION

Field of the invention

The invention in general relates to a feedback control system, and particularly to a system carried by a towed vehicle for maintaining the vehicle at a predetermined constant distance from a reference and at a predetermined orientation.

Description of the prior art

In data sensing and gathering operations, particularly in the field of oceanography, use is made of a cable towed vehicle which carries various instrumentation such as sensors, cameras, television and sonar equipment, to name a few. It is often desired that the vehicle be towed at a constant altitude from the ocean bottom to thereby follow its contours, or alternatively at a constant distance from the surface.

A common method for controlling the altitude of a towed vehicle utilizes an active winch to vary the cable length, and thus the vehicle altitude. In this type of system, the maximum winching rate becomes a limiting factor when operating at high speeds over an irregular ocean bottom surface.

Another system uses a fixed depressor surface to maintain a constant depth below the surface. For this type of system however, the operating depth becomes a function of the type of depressor, cable lengths and operating speed, and does not have a bottom contour following capability.

In order to provide for depth or altitude variation and control one type of vehicle incorporates the use of rotatable control surfaces, for example, rotatable wing surfaces which will vary the altitude of the vehicle if rotated while the vehicle is being towed. In such a system, a certain wing angle is commanded when there is an error (or tail control surface angle when there is a roll error), and the response of the vehicle will result in a known change of altitude for a certain speed or speed range. The vehicle carries a depth or altitude sensor for deriving a position signal which is compared with a reference, and if there is an error a certain wing angle will be commanded in accordance with the control statement; $\theta_C = C_1 A_e + C_2 \dot{A}_e$, where $\theta_C$ is the wing angle which is commanded when there is an altitude error $A_e$. $\dot{A}_e$ is the rate of change of the altitude error and $C_1$ and $C_2$ are constants for the particular system.

To control a wing angle in accordance with the control statement means that a steady state error ($A_e$ has some value and $\dot{A}_e = 0$) is required to maintain a wing angle $\theta$ to counteract any steady-state vertical forces, such as an upward force on the vehicle from the tow cable. If there is a tow force from the cable, and tow force is dependent upon depth and speed, then a variable wing angle is needed to counteract that force. In order to have a wing angle, in accordance with the control statement, an altitude error is required so that in the prior art system of commanding a wing angle an accurate desired altitude or depth is seldom attained.

In the prior art system of commanding a certain wing angle, in accordance with the vehicle deviation from a reference, a signal indicative of the actual wing angle is required for feedback control purposes. In a mechanical system where the wings are rotated by means of gears a feedback signal proportional to actual angle may be developed which includes a lot of noise or chatter components due to mechanical linkages to thus degrade the signal and reduce the efficiency of operation.

Accordingly, it is an object of the present invention to provide a control system for a towed vehicle which enables the towed vehicle to accurately follow a bottom contour at a specified height above the contour or to accurately maintain a predetermined distance below a reference.

A further object of the present invention is to provide a control system for a towed vehicle having rotatable control surfaces which eliminates the need for measuring the angular orientation of the control surfaces.

A further object is to provide an improved control system of the type described which further stabilizes the vehicle with respect to rolling action.

SUMMARY OF THE INVENTION

A control system is provided for maintaining a towed vehicle in a desired orientation at a predetermined distance from a reference as the vehicle is being towed. The vehicle has rotatable control surfaces to vary its attitude and motive means are provided to rotate the control surfaces in accordance with a certain input signal. The control system includes circuit means which derives a control signal indicative of the difference between a desired rate of rotation of the control surfaces, with respect to a stationary inertial coordinate reference, and the actual rate of rotation of the control surfaces. The control signal thus derived is supplied to the motive means to command a certain rate of rotation of the controlled surfaces as opposed to commanding a certain control surface angle.

BRIEF DESCRIPTION OF THE DRAWINGS

FIG. 1 illustrates by way of an example an underwater environment wherein vehicle 10 is towed by means of tow cable 12 connected to a surface craft 14, although it is to be understood that the towing craft may be any one of a number of different submerged, surface, or air varieties. The vehicle 10 is towed over the ocean bottom 17 and for one mode of operation it may be desired that the vehicle 10 be maintained at a predetermined distance H above the ocean bottom 17 reference so as to follow the contour thereof as illustrated by the dotted path 19. For other applications, it may be desired that the vehicle 10 maintain a constant distance D below the water surface 21 reference so as to follow the dashed path 23.

Figure 1:
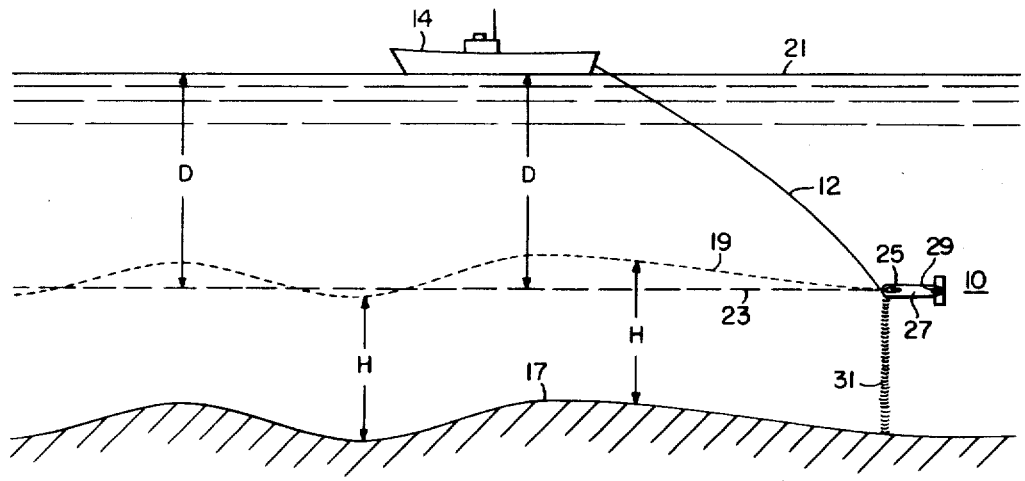
FIG. 1 illustrates a towed vehicle in an underwater environment demonstrating two possible "flight" paths.

Vehicle 10 has rotatable control surfaces to vary its vertical positioning and angular orientation about a roll axis. For convenience the control surfaces may be rotatable wing surfaces 25 located on either side of the body 27 in addition to rotatable tail surfaces 29, 29' located on either side of the body 27.

In order to maintain path 19, it is necessary that the altitude of the vehicle 10 above the ocean bottom 17 be known. The actual altitude may be determined by known sonar techniques whereby the time required for an emitted sonar signal 31 to hit the bottom and return to the vehicle 10 is an indication of the height H. For maintaining operation along the path 23, a suitable pressure indicator indicative of depth may be utilized, or alternatively, an upward looking sonar system may be used.

As the vehicle 10 is towed, it may pitch and roll and in maintaining a prescribed path the control surfaces may rotate. Various responses of the vehicle are set forth by way of explanation in FIGS. 2A to 2D to which reference is now made.

Figure 2A:
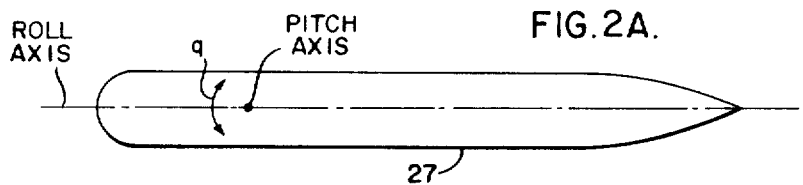
FIGS. 2A to 2D illustrate various portions of a towed vehicle such as in FIG. 1 and serve to define various terms utilized therein.

FIG. 2A is a side view of the vehicle body 27. The body 27 may oscillate about a pitch axis and the rate of this oscillation, or pitch rate, with respect to a stationary reference herein termed an inertial coordinate system, is defined by the term $q$ which therefore is a rate of rotation as opposed to a pitch angle.

Figure 2B:
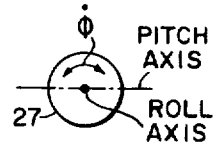

The body 27 may also rotate about a roll axis such as illustrated in FIG. 2B and the rate of rotation about the roll axis (as opposed to an angular displacement $\phi$) is herein termed $\dot{\phi}$.

Figure 2C:
Figure 2D:

FIG. 2C illustrates a side view of a rotatable wing surface. The wing surface 25 is rotatable about a wing shaft axis and the rate of rotation about that axis is given the designation $\omega$. In addition, the wing surface 25 is rotatable with respect to the inertial coordinate system. This latter rate of rotation is herein designated $s$. If the pitch rate $q$ of the body 27 is zero, then the rate of rotation $\omega$ is equal to the rate of rotation $s$.

In the present invention, a rate of rotation for the control surfaces is commanded. The rate of rotation of the wing surfaces with respect to the stationary inertial coordinate system is commanded in accordance with altitude error and the rate of change of altitude error (or depth error and rate of change of depth error). This statement of control may be expressed mathematically as:

$$s_c = K_1 A_e + K_2 \dot{A}_e \quad (1)$$

where $s_c$ is the commanded rate of rotation of the wing surfaces with respect to the inertial coordinates system, $A_e$ is the altitude error, $\dot{A}_e$ is the rate of change of altitude error, and $K_1$ and $K_2$ are multiplication constants dependent upon vehicle response.

The commanded rate of rotation $s_c$ is compared with an actual rate of rotation $s_a$ (with respect to the inertial coordinate system) and any difference therebetween results in an error signal $s_e$ which drives servomechanism apparatus controlling the wing surfaces. As a practical matter, an indication of the actual rate of rotation $s_a$ of the wing surfaces with respect to a stationary inertial coordinate system is difficult to obtain. The actual rate of rotation $s_a$ is related to the actual rate of rotation $\omega_a$ of the wing surfaces with respect to the body by the expression:

$$s_a = \omega_a + q_a \quad (2)$$

$q_a$ is easily measured and $\omega_a$ is easily measured so that the control statement of Equation 1 may be expressed in terms of easily measured quantities as follows:

$$\omega_e = K_1 A_e + K_2 \dot{A}_e - q_a \quad (3)$$

Figure 3:
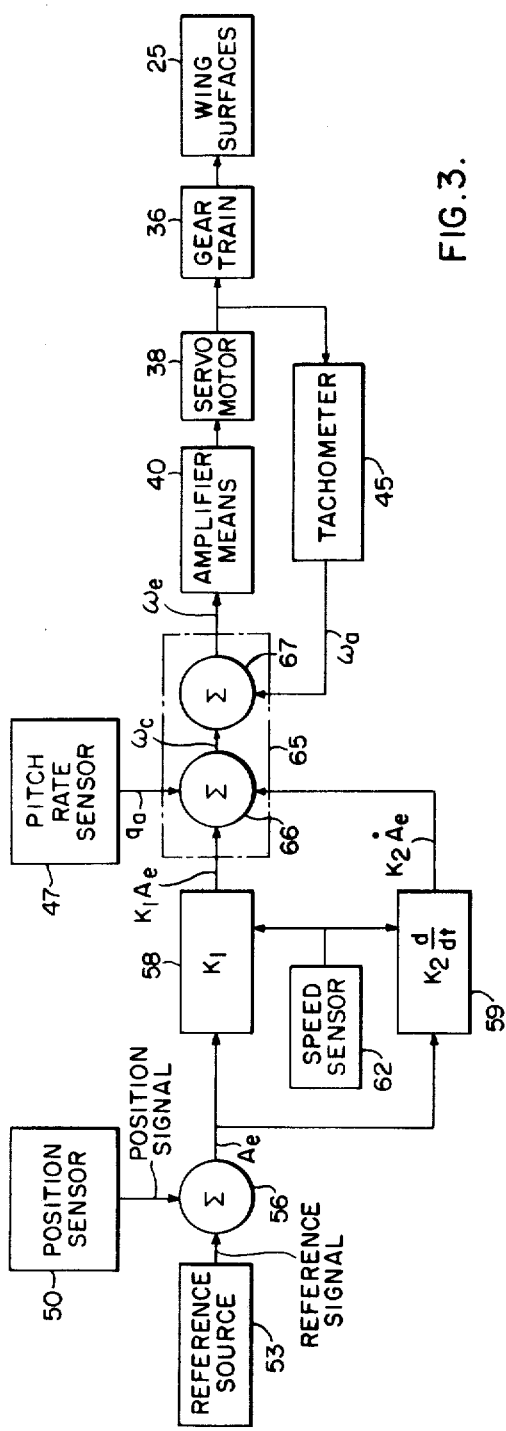
FIG. 3 illustrates a block diagram of one embodiment of the present invention.

FIG. 3 illustrates a block diagram of a control system operating in accordance with Equation 3.

In the description of operation of the control system, reference is made to commanded, actual and error signals. To aid in a reading of the description of the preferred embodiment the following Table I sets out definitions of various terms used throughout. Pitch or roll rate designations are additionally illustrated in FIGS 2A to 2D.

TABLE I $q_a$=actual rate of rotation (pitch) of body with respect to stationary inertial coordinate system.

$\omega_a$=actual rate of rotation of wing surfaces with respect to body.

$\omega_c$=commanded rate of rotation of wing surfaces with surfaces with respect to body.

$\omega_e = \omega_a - \omega_c$=error signal which drives servo if $\omega_a$ is sensed and Equation 3 utilized.

$s_a$=actual rate of rotation of wing surfaces with respect to inertial coordinate system.

$s_c$=commanded rate of rotation of wing surfaces with respect to inertial coordinate system.

$s_e = s_a - s_c$=error signal which drives servo if $s_a$ is sensed and Equation 1 utilized.

$A_e$=altitude (or depth) error.

$\dot{A}_e$=rate of change of altitude (or depth) error.

$\tau_a$=actual tail rate of rotation with respect to body.

$\tau_c$=commanded tail rate of rotation with respect to body.

$\tau_e = \tau_a - \tau_c$=error signal which drives servo.

$\phi_e$=roll angle deviation from reference position.

$\dot{\phi}_e$=rate of change $\phi_e$.

In FIG. 3, the block designated 25 represents the rotatable wing surfaces driven, that is rotated, by a motive means. One suitable motive means, shown by way of example, includes a gear train 36 driven by a servomotor 38 supplied with a suitable input signal from amplifier means 40.

Circuit means are provided for deriving a control signal to drive the servomotor 38, which control signal is indicative of the difference between a desired rate of rotation of the wing surfaces 25 with respect to a stationary inertial coordinate system and the actual rate of rotation of the wing surfaces with respect to such coordinate system. One way of deriving an indication of the actual rate of rotation of the wing surfaces with respect to the co-ordinate system is to obtain an indication of the rate of rotation of the wing surfaces with respect to the body, and modify that indication by the rate of rotation of the body with respect to the coordinate system. In FIG. 3, means are provided for deriving a signal indicative of the rate of rotation of the wing surfaces with respect to the body, such means being in the form of tachometer 45 which is responsive to the shaft rotation of the servomotor 38 in a well known manner, to provide an output rotation signal herein disignated $\omega_a$.

The rate of rotation of the body with respect to the stationary inertial coordinate system is obtained by a pitch rate sensor 47 the output signal of which is designated $q_a$. Obviously other methods are available for obtaining $q_a$, such methods including the use of an accelerometer to derive pitch acceleration and integrating such acceleration or alternatively obtaining an indication of pitch angle and differentiating such indication.

The commanded rate of rotation is in accordance with Equation 3 which sets forth a relationship involving altitude error $A_e$. Accordingly a position sensor 50 provides a position signal indicative of the vehicle's actual position. Such position sensor 50 may include sonar means as previously described or a pressure indicator indicative of depth.

In order to derive a positional error, and in the present example an altitude error, the position signal from the position sensor 50 is compared with a reference signal from a reference source 53, and which reference signal is indicative of a desired altitude. Such reference signal may be fixed, or may be varied during the course of travel of the vehicle by means of automatic circuitry, or by means of suitable connection to a towing craft.

The position and reference signals are compared at summing means 56 and any difference therebetween results in an altitude error signal $A_e$ which is provided to circuits 58 and 59. The altitude error signal $A_e$ is multiplied by a constant $K_1$ in the circuit 58 which provides an error signal $K_1K_2A_e$. The derivative of $A_e$, that is, the rate of change of $A_e$ is obtained and multiplied by a constant $K_2$ in the circuit 59 which provides a rate of change of error signal $K_2\dot{A}_e$. The constants $K_1$ and $K_2$ are functions of the vehicle response and speed, and are chosen in accordance with well known techniques for a predetermined speed or speed range. In order to vary the constants $K_1$ and $K_2$ to accommodate a different speed range, there may be provided a speed sensor circuit 62 which is operative to provide different output signals for different speed ranges to effect a predetermined change in $K_1$ and $K_2$. Alternatively, with electrical connections to the towing craft, $K_1$ and $K_2$ may be varied from a remote position.

Circuit means are provided for implementing Equation 3 to obtain an $\omega_c$. This is illustrated functionally in FIG. 3 by the provision of a summing means 65 having a first summing point 66 which receives the signals $K_1A_e$, $K_2\dot{A}_e$ and $q_a$ to provide an output $\omega_c$. $\omega_c$ is compared with the output of tachometer 45, that is signal $\omega_a$, at summing point 67, the comparison resulting in an error signal $\omega_e$ which is also herein referred to as a control signal which forms the input to the motive means to drive the wing surfaces 25.

Figure 4:
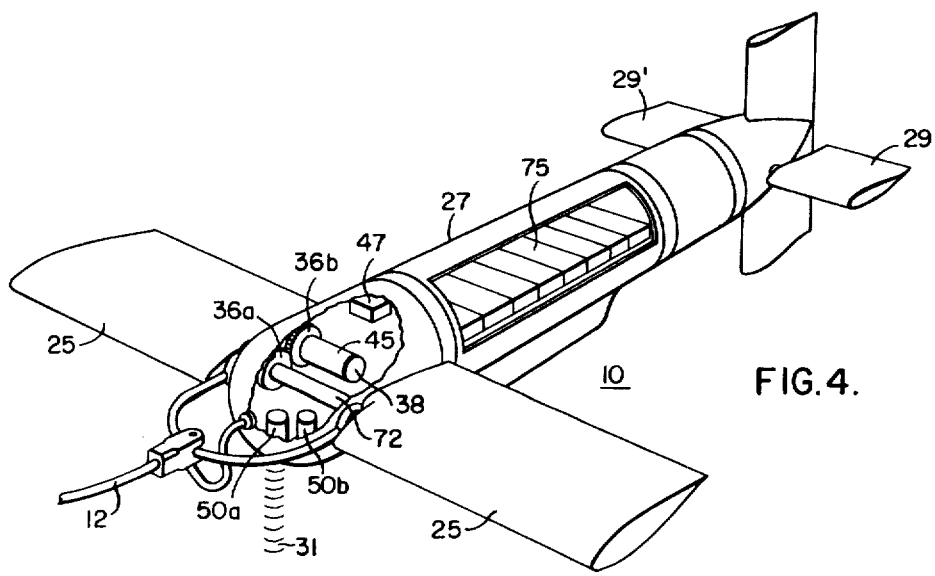
FIG. 4 is a more detailed view of the towed vehicle of FIG. 1, with portions broken away.

FIG. 4 is a view of the vehicle 10, with portions broken away to illustrate some of the components shown in the block diagram of FIG. 3. The wing surfaces 25 are rotatable by means of shaft 72, connected to a quarter segment gear 36A intermeshed with gear 36B, and designated as the gear train 36 of FIG. 3. A servomotor 38 drives the gear train and the tachometer 45 may be included in the same housing as the servomotor.

The sonar signal 31 is provided by means of a sonar transducer 50A forming a portion of the position sensor means 50 of FIG. 3, or the position signal may be obtained utilizing a pressure sensor 50B for a constant depth below the water surfaces to be maintained.

The pitching of the body 27 is sensed by the pitch rate sensor 47 and the calculating, and other circuitry is located in the electronic section 75.

Rotatable tail surfaces 29 and 29' are provided in order to compensate for roll deviation from normal. When the tail surfaces are rotated they rotate differentially, that is, one will rotate upwards while the other rotates downwards and accordingly the starboard tail surface has been given a primed designation and the operation with respect to roll stabilization will be described subsequently with respect to FIGS. 6 and 7.

Figure 5:
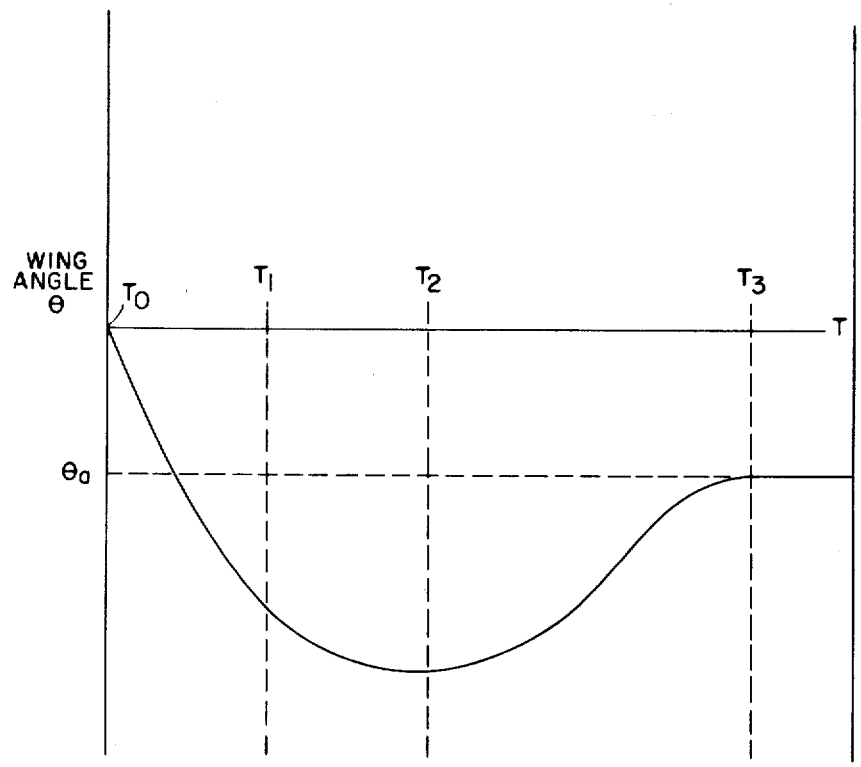
FIG. 5 is a curve to aid in an understanding of the operation of the present invention.

FIG. 5 is a curve to illustrate the response of the wing surfaces 25 when an error in altitude is detected. To change altitude, the wing surfaces 25 concurrently change their angle and FIG. 5 is a plot of wing angle as a function of time during operation of the circuitry of FIG. 3. Although wing angle is plotted it is to be remembered that there is no requirement to measure this wing angle since the present invention commands a rate of rotation of the wing surfaces 25 to eliminate the need for a constant error and the need for a wing angle sensor.

FIG. 5 will be described with respect to the operation of FIG. 3 where a rate of rotation is commanded as a function of an altitude error $A_e$ and a rate of change of altitude error $\dot{A}_e$. At time $T_0$ the vehicle erroneously increases its altitude due to, for example, a tow force. $K_1A_e$ and $K_2\dot{A}_e$ act together to effect a rotation of the wing surface downward. This is represented in FIG. 5 by the curve from $T_0$ to $T_1$ representing an increase in the downward angle of the wing angle $\theta$.

In response to the commanded rate of rotation, the wing angle reaches a point wherein the vehicle no longer rises and accordingly the term $K_2\dot{A}_e=0$. This situation occurs in FIG. 5 at time $T_1$ where it is seen that the curve has a decreased slope but since $K_1A_e$ is still positive, the wing is still commanded to rotate downward to cause the vehicle to decrease in altitude. When the vehicle commences to decrease in altitude, there is again a rate of change of error $\dot{A}_e$, however, it is now in an opposite direction so that in effect the quantity $K_2A_e$ is subtracted from $K_1A_e$ as illustrated by the progressively decreasing slope of the curve between times $T_1$ and $T_2$. That is, as the vehicle decreases in altitude, $K_2\dot{A}_e$ is negative which in effect is commanding the wing to rotate upwards. $K_1A_e$ however is positive, commanding the wing to rotate downwards with the net effect being that the wing surfaces rotate downwardly at a slower rate.

As the altitude error $A_e$ gets progressively smaller, the rate of change term $K_2\dot{A}_e$ becomes greater than $K_1A_e$ and the wings start rotating upwardly as indicated by the decrease in negative wing angle commencing past time $T_2$ ($T_2$ is the point where $K_1A_e$ just equals $K_2\dot{A}_e$).

As the correct altitude is approached, $A_e$ and $\dot{A}_e$ go to zero values but since the wing surfaces were rotated downwardly faster for a greater time period than rotated upwardly there is a net down angle on the wings at time $T_3$ where $A_e=\dot{A}_e=0$. It is seen therefore that the control system operates to correctly position the vehicle by commanding a rate of rotation of the wing surfaces and the correct position is attained with a net downward wing surface angle such as $\theta_a$ in FIG. 5.

Figure 6:
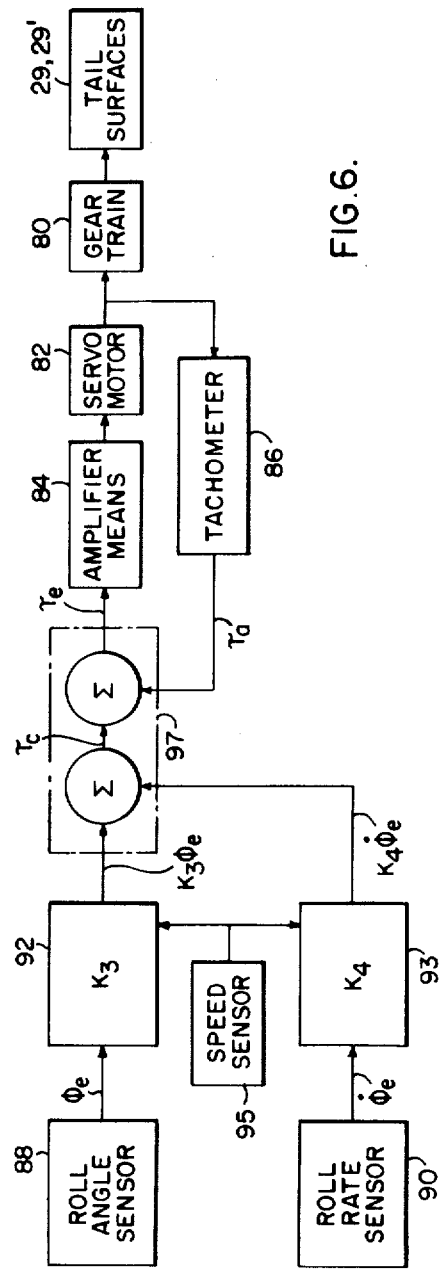
FIG. 6 illustrates a block diagram for roll control of the vehicle of FIG. 4.
Figure 7:
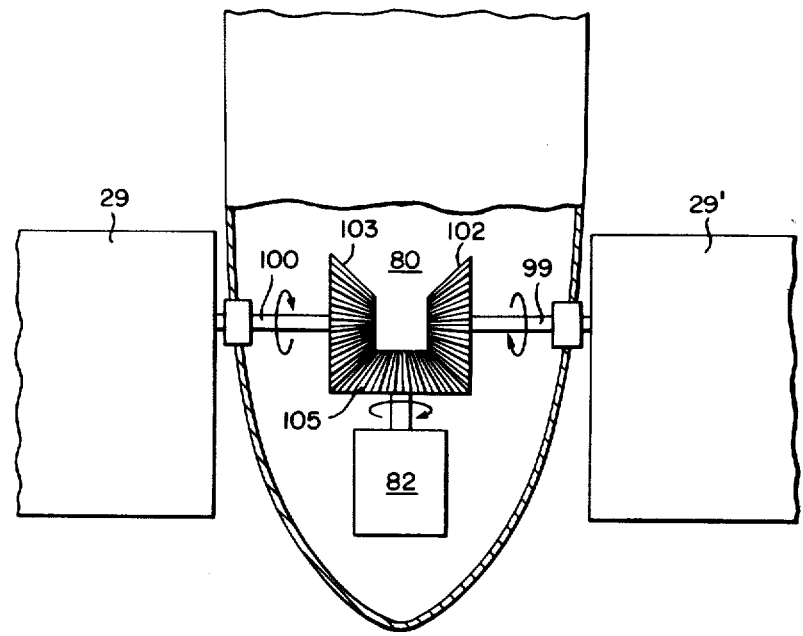
FIG. 7 illustrates a typical drive arrangement for the rotatable tail surfaces of the vehicle of FIG. 4.

FIG. 6 illustrates the circuitry for roll compensation and is similar in many respects to the circuitry of FIG. 3 in that a rate of rotation of the tail surfaces 29, 29' is commanded in accordance with the control statement $\tau_c=K_3\phi_e+K_4\dot{\phi}_e$.

A gear train 80 serves to rotate the tail surfaces when driven by a servomotor 82 receiving its input signal from amplifier means 84. An indication of the rate of rotation of the tail surfaces is provided by means of tachometer 86 the output signal of which is rotation signal $\tau_a$.

Means are provided for obtaining indications of the values $\phi_e$ and $\dot{\phi}$. These values can be obtained in any one of a number of ways such as by measurement of roll angle with appropriate differentiation, by measurement of roll angle and roll rate, or by measurement of roll acceleration with suitable integration. In FIG. 6, a first sensor 88 is provided for obtaining an indication of the roll angle $\phi$. For normal operation, the desired $\phi$ is zero degrees and accordingly any output signal provided by the roll angle sensor 88 is an error signal indicating an angular deviation from normal. A second sensor, a roll rate sensor 90 is provided for deriving the rate of angular change $\dot{\phi}_e$.

First and second circuits 92 and 93 perform the required multiplication by constants $K_3$ and $K_4$ to provide error signal $K_3\phi_e$ and rate of change of error signal $K_4\dot{\phi}_e$, respectively. As was the case with respect to FIG. 3 a speed sensor 95 may be provided to vary the value of constants $K_3$ and $K_4$ in accordance with predetermined speed ranges.

A summing means 97 combines all the signals provided thereto, to in turn provide a control or error signal $\tau_e$ to the amplifier means 84. Functionally the summing means 97 combines the signals $K_3\phi_e$ and $K_4\dot{\phi}_e$ to result in a signal $\tau_c$ a commanded rate of rotation of the tail surfaces, in accordance with the control statement. The commanded rate of rotation is compared with the actual rate of rotation $\tau_a$ to result in an error signal $\tau_c$.

The error signal $\tau_e$ causes the tail surfaces to rotate differentially. This operation may be seen in FIG. 7 which illustrates the starboard tail surface 29', and the port tail surface 29 each connected by means of respective shafts 99 and 100 to gears 102 and 103 which mesh with a third gear 105. Gears 102, 103 and 105 form the gear train 80, which is driven by the servomotor 82. As the servomotor 82 causes rotation as indicated by the arrow, the tail surfaces 29' and 29 will rotate differentially as indicated by the respective arrows around shafts 99 and 100. If the vehicle is pitching, the rotation of tail surface 29' with respect to a stationary inertial coordinate system will have a vehicle pitch component. The other tail surface 29 however rotates in an opposite direction than tail surface 29' and its rotation with respect to the stationary inertial coordinate system will have a vehicle pitch component which is equal and opposite to the pitch component associated with the tail surface 29'. These components cancel one another and there is no requirement for a vehicle pitch sensor to be included in the circuitry of FIG. 6.

Although the present invention has been described with a certain degree of particularly, it should be understood that the present disclosure has been made by way of example and that modifications and variations of the present invention are made possible in the light of the above teachings.

We claim as our invention:

1. A control system for maintaining a towed vehicle in a desired orientation at a predetermined distance from a reference, the towed vehicle having rotatable control surfaces to vary vehicle attitude as it is towed through a fluid medium, comprising:
   (a) motive means operative in response to an input signal for rotating said control surfaces;
   (b) circuit means for deriving a control signal indicative of the difference between a desired rate of rotation of said control surfaces with respect to a stationary inertial coordinate system and the actual rate of rotation of said control surfaces with respect to said coordinate system; and
   (c) means for supplying said control signal to said motive means.

2. Apparatus according to claim 1, wherein the control surfaces are rotatable wing surfaces and wherein the circuit means of clause (b) includes:
   (a) a position sensor for providing a position signal indicative of the vehicle's actual position from a reference;
   (b) means responsive to said position signal for providing
      (i) an error signal ($K_1 A_e$) indicative of the difference in the actual and desired position, and
      (ii) a rate of change of error signal ($K_2 \dot{A}_e$);
   (c) first sensing means for providing a pitch rate signal ($q_a$) indicative of the pitch rate of the vehicle with respect to the stationary inertial coordinate system;
   (d) second sensing means for providing a rotation signal ($\omega_a$) indicative of the rate of rotation of said wing surfaces with respect to the vehicle;
   (e) means for combining said error, rate of change of error, pitch rate and rotation signals, to derive the control signal.

3. Apparatus according to claim 2 which additionally includes:
   (a) means for modifying the valve of the error signal ($K_1 A_e$) and the rate of change of error signal ($K_2 \dot{A}_e$) in accordance with vehicle speed.

4. Apparatus according to claim 2 wherein:
   (a) the motive means includes a servomotor; and
   (b) the second sensing means is a tachometer operatively connected to said servomotor for providing an output signal proportional to the rotation of said servomotor.

5. Apparatus according to claim 1 wherein the control surfaces are rotatable tail surfaces and wherein the circuit means of clause (b) includes:
   (a) means for deriving
      (i) an error signal ($K_3 \phi_e$) indicative of the deviation of the vehicle about a roll axis, with respect to a reference, and
      (ii) a rate of change of error signal ($K_4 \dot{\phi}_e$)
   (b) sensing means for providing a rotation signal ($\tau_a$) indicative of the rate of rotation of said tail surfaces with respect to the vehicle;
   (c) means for combining the error, rate of change of error and rotation signals to derive the control signal.

6. Apparatus according to claim 5 which includes:
   (a) means for simultaneously and differentially rotating the tail surfaces to rotate in opposite directions.

References Cited

UNITED STATES PATENTS

| | | | |
|---|---|---|---|
| 3,125,980 | 3/1964 | Anderson | 114—235 |
| 3,351,895 | 11/1967 | Cupp et al. | 340—3 |

RICHARD A. FARLEY, Primary Examiner

U.S. Cl. X.R.

244—3; 114—235